US012368254B2

(12) United States Patent
Asano et al.

(10) Patent No.: US 12,368,254 B2
(45) Date of Patent: Jul. 22, 2025

(54) CONNECTOR DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yasunori Asano, Mie (JP); Yutaka Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 422 days.

(21) Appl. No.: 17/918,524

(22) PCT Filed: Mar. 16, 2021

(86) PCT No.: PCT/JP2021/010471
§ 371 (c)(1),
(2) Date: Oct. 12, 2022

(87) PCT Pub. No.: WO2021/215141
PCT Pub. Date: Oct. 28, 2021

(65) Prior Publication Data

US 2023/0163498 A1 May 25, 2023

(30) Foreign Application Priority Data

Apr. 23, 2020 (JP) ................................ 2020-076457

(51) Int. Cl.
*H01R 12/71* (2011.01)
*H01R 12/91* (2011.01)
*H01R 13/631* (2006.01)

(52) U.S. Cl.
CPC .......... *H01R 12/716* (2013.01); *H01R 12/91* (2013.01); *H01R 13/631* (2013.01)

(58) Field of Classification Search
CPC .... H01R 12/91; H01R 12/716; H01R 13/631; H01R 12/73
(Continued)

(56) References Cited

U.S. PATENT DOCUMENTS 5,879,177 A 3/1999 Honma
5,885,103 A * 3/1999 Ernolf ................ H01R 13/6592 439/246
(Continued)

FOREIGN PATENT DOCUMENTS

CN 205070039 U 3/2016
JP 2010-212138 A 9/2010

OTHER PUBLICATIONS

International Search Report issued on May 18, 2021 for WO 2021/215141 A1 (5 pages).

*Primary Examiner* — Christopher M Koehler
*Assistant Examiner* — Gregory L Mangot
(74) *Attorney, Agent, or Firm* — Venjuris, P.C.

(57) ABSTRACT

It is aimed to provide a connector device excellent in the reliability of a connecting operation. A connector device is provided with a first housing (11) to be mounted on a first circuit board (Pa), a plurality of mounting terminals (13) to be mounted into the first housing (11) and connected to the first circuit board (Pa), a plurality of movable terminals (40) individually rockable with the plurality of mounting terminals (13) as fulcrums and to be individually connected to a
(Continued)

plurality of mating terminals (36), and a coupling member (60) formed such that the plurality of movable terminals (40) are passed therethrough.

5 Claims, 8 Drawing Sheets

(58) Field of Classification Search
USPC .................................................... 439/66, 246
See application file for complete search history.

(56) References Cited

U.S. PATENT DOCUMENTS

| | | | | |
|---|---|---|---|---|
| 8,801,459 | B2 | 8/2014 | Mrowka | |
| 2013/0102181 | A1 | 4/2013 | Aimoto | |
| 2015/0126061 | A1* | 5/2015 | Paynter .................. | H01R 24/38 439/567 |
| 2018/0301829 | A1 | 10/2018 | Hoyack et al. | |
| 2018/0301830 | A1 | 10/2018 | Hoyack et al. | |
| 2019/0334269 | A1* | 10/2019 | Hoyack .................. | H05K 1/111 |

* cited by examiner

CONNECTOR DEVICE

CROSS REFERENCE TO RELATED APPLICATIONS

This application is a national phase of PCT application No. PCT/JP2021/010471, filed on 16 Mar. 2021, which claims priority from Japanese patent application No. 2020-076457, filed on 23 Apr. 2020, all of which are incorporated herein by reference.

TECHNICAL FIELD

The present disclosure relates to a connector device.

BACKGROUND

Patent Document 1 discloses a connector device including a first connector and a second connector facing each other and configured to connect the both connectors via an adapter. The adapter is relatively rockably mounted in the first connector. When the first and second connectors are shifted in position in a direction intersecting a facing direction, the adapter is inclined to accommodate position shifts of the both connectors, wherefore the both connectors can be connected.

PRIOR ART DOCUMENT

Patent Document

Patent Document 1: U.S. Pat. No. 8,801,459

SUMMARY OF THE INVENTION

Problems to be Solved

In the case of applying the above connection structure for connecting the first and second connectors via the adapter to a multipole connector device, there is concern over the following problem. Since the adapters are freely rockable with respect to the first connector, each adapter is possibly inclined in a direction different from the other adapters in a state where the first and second connectors are not connected yet. Thus, when an attempt is made to connect a plurality of the first connectors and a plurality of second connectors, it is difficult to connect a plurality of the adapters to the second connectors at once.

A connector device of the present disclosure was completed on the basis of the above situation and the present disclosure aims to provide a connector device excellent in the reliability of a connecting operation.

Means to Solve the Problem

The present disclosure is directed to a connector device with a housing to be mounted on a circuit board, a plurality of mounting terminals to be mounted into the housing and connected to the circuit board, a plurality of movable terminals individually rockable with the plurality of mounting terminals as fulcrums, the movable terminals being individually connected to a plurality of mating terminals, and a coupling member formed such that the plurality of movable terminals are passed therethrough.

Effect of the Invention

According to the present disclosure, the reliability of a connecting operation is excellent.

DETAILED DESCRIPTION TO EXECUTE THE INVENTION

Description of Embodiments of Present Disclosure

Figure 1:
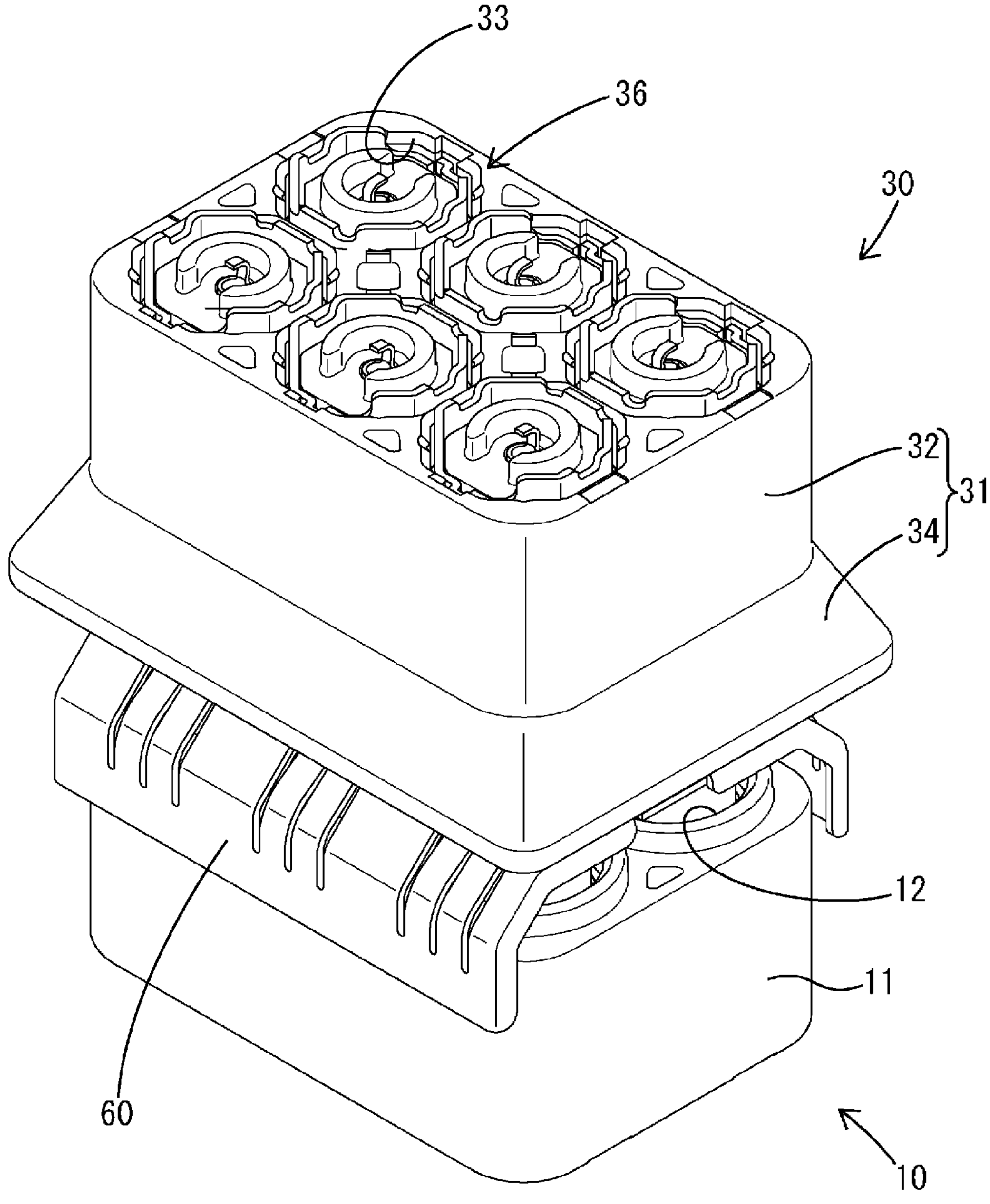
FIG. 1 is a perspective view of a connector device of one embodiment.

First, embodiments of the present disclosure are listed and described.

(1) The connector device of the present disclosure is provided with a housing to be mounted on a circuit board, a plurality of mounting terminals to be mounted into the housing and connected to the circuit board, a plurality of movable terminals individually rockable with the plurality of mounting terminals as fulcrums, the movable terminals being individually connected to a plurality of mating terminals, and a coupling member formed such that the plurality of movable terminals are passed therethrough. According to the configuration of the present disclosure, since the plurality of movable terminals are integrally rocked by the coupling member, the plurality of movable terminals are kept in a fixed positional relationship. In this way, the plurality of movable terminals are reliably connected to the mating terminals, wherefore the connector device of the present disclosure is excellent in connection function.

(2) Preferably, the plurality of movable terminals are formed with holding portions for holding the plurality of movable terminals in a state passed through the coupling member. According to this configuration, since the plurality of movable terminals are held in the state passed through the coupling member, the housing needs not be provided with a structure for preventing the separation of the coupling member from the plurality of movable terminals. Therefore, the housing can be reduced in size and, consequently, the entire device can be reduced in size.

(3) Preferably, the coupling member is formed with resilient holding pieces to be resiliently locked to the holding portions. According to this configuration, when the coupling member and the movable terminals are relatively inclined as the plurality of movable terminals rock, the resilient holding pieces are flexibly resiliently deformed by being pushed by the holding portions. Thus, prying is hardly caused between the coupling member and the movable terminals. In this way, the movable terminals smoothly rock.

(4) Preferably, the coupling member is made of an electrically conductive material, and the coupling member is formed with resilient contact pieces configured to resiliently contact movable-side outer conductors of the movable terminals. According to this configuration, since a plurality of the movable-side outer conductors are made conductive via the coupling member, a potential difference is not generated among the plurality of movable-side outer conductors. Therefore, the connector device of the present disclosure is excellent in grounding function.

(5) Preferably, the coupling member is plate-like, and the coupling member is formed with a rib-like projecting reinforcing portion. According to this configuration, since the coupling member can be prevented from being deformed to strain by the reinforcing portion, the orientations and postures of the plurality of movable terminals during rocking movements can be aligned.

(6) Preferably, in (5), the reinforcing portion includes a first reinforcing rib bent to project from an outer peripheral edge of the coupling member and a second reinforcing rib arranged along the outer peripheral edge in a region of the coupling member separated from the outer peripheral edge. A part of the coupling member along the outer peripheral edge is reinforced by the first and second reinforcing ribs. Out of a part connected to the outer peripheral edge of the coupling member, a region where the first reinforcing rib bent to project from the outer peripheral edge cannot be formed can be reinforced by the second reinforcing rib.

(7) Preferably, in (6), the first and second reinforcing ribs are partially arranged in the same region in a length direction of the outer peripheral edge. According to this configuration, the entire region of the part connected to the outer peripheral edge of the coupling member can be reliably reinforced by either one of the first and second reinforcing ribs.

DETAILS OF EMBODIMENT OF PRESENT DISCLOSURE

Embodiment

Figure 2:
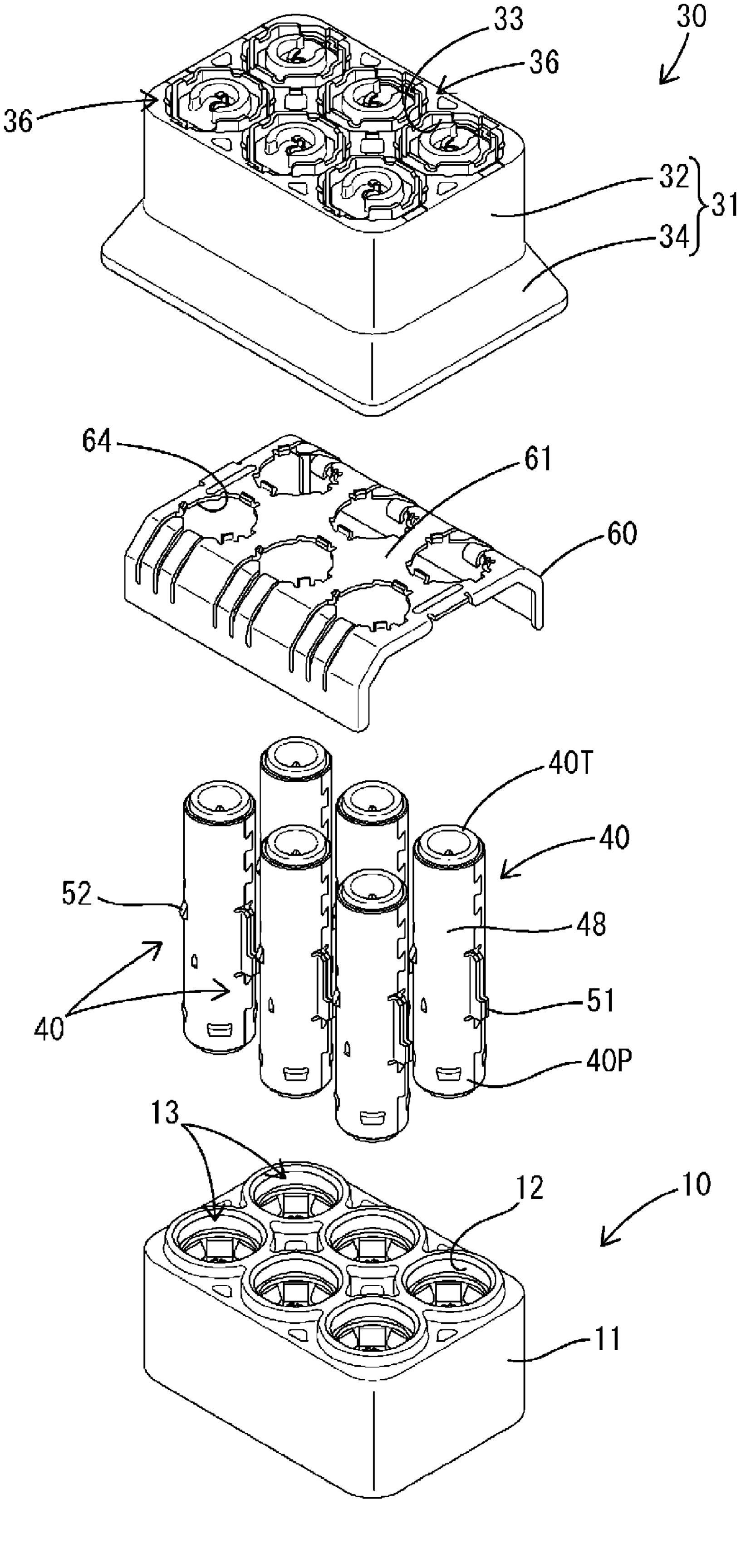
FIG. 2 is an exploded perspective view of the connector device.
Figure 3:
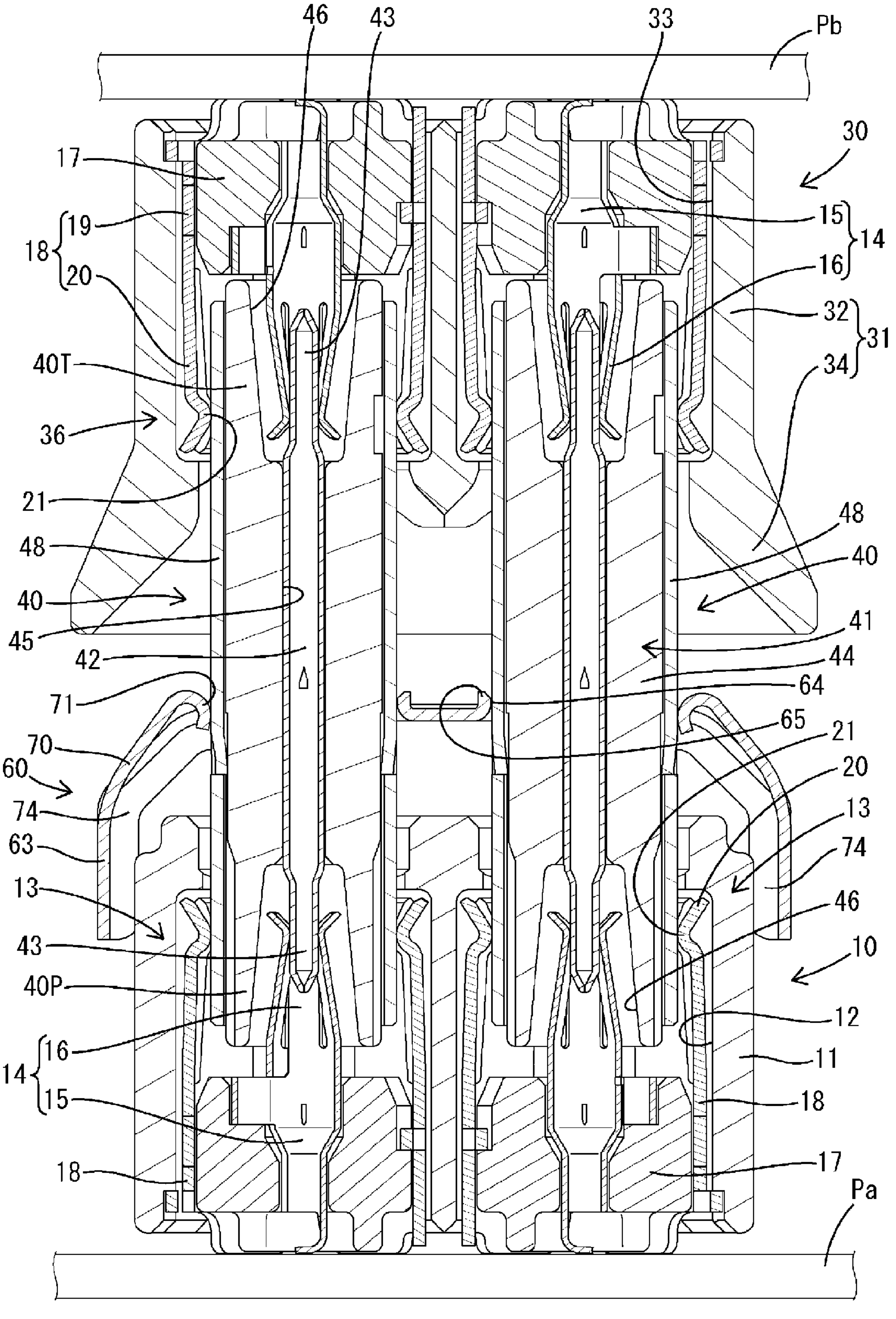
FIG. 3 is a front view in section of the connector device.
Figure 4:
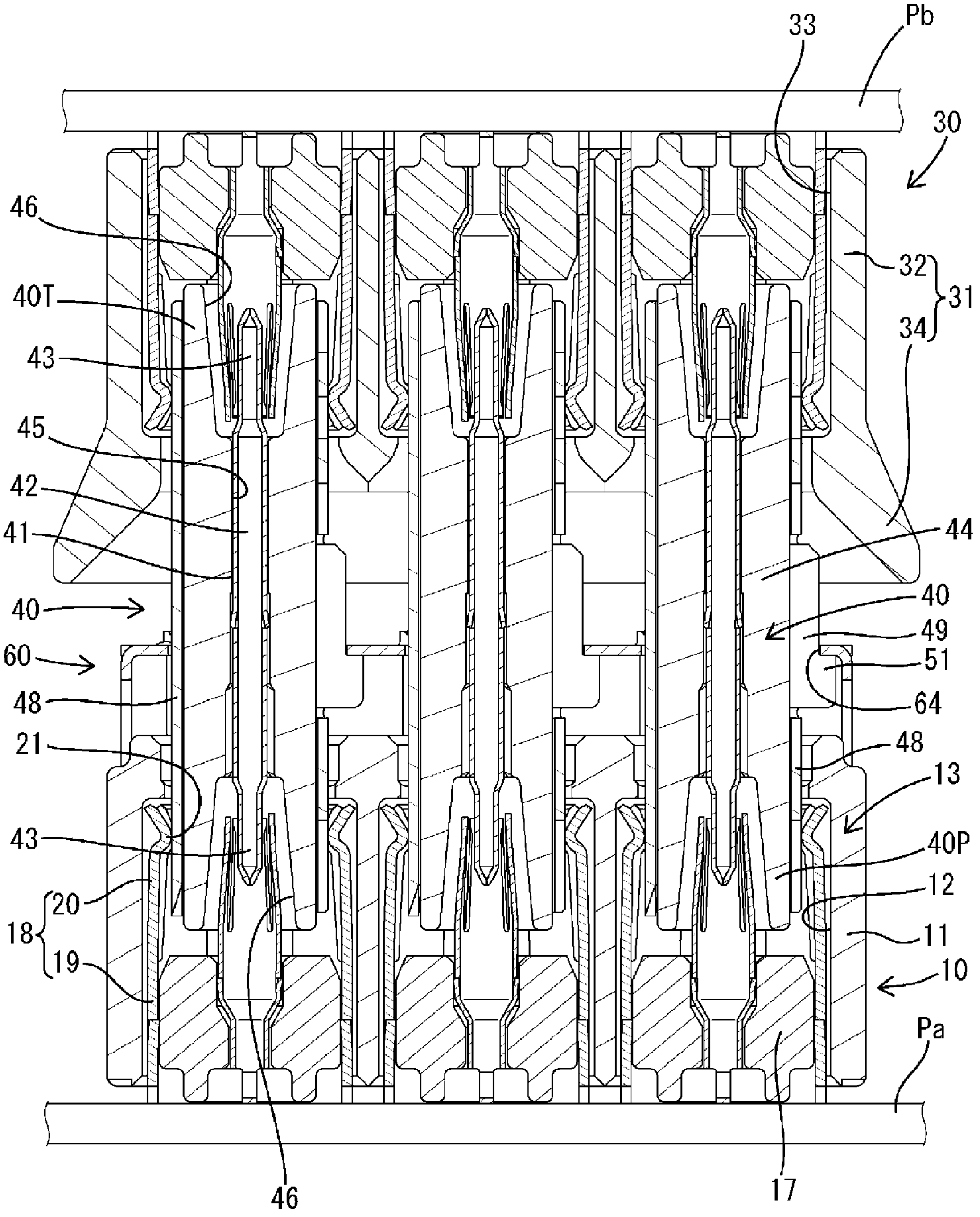
FIG. 4 is a side view in section of the connector device.
Figure 6:
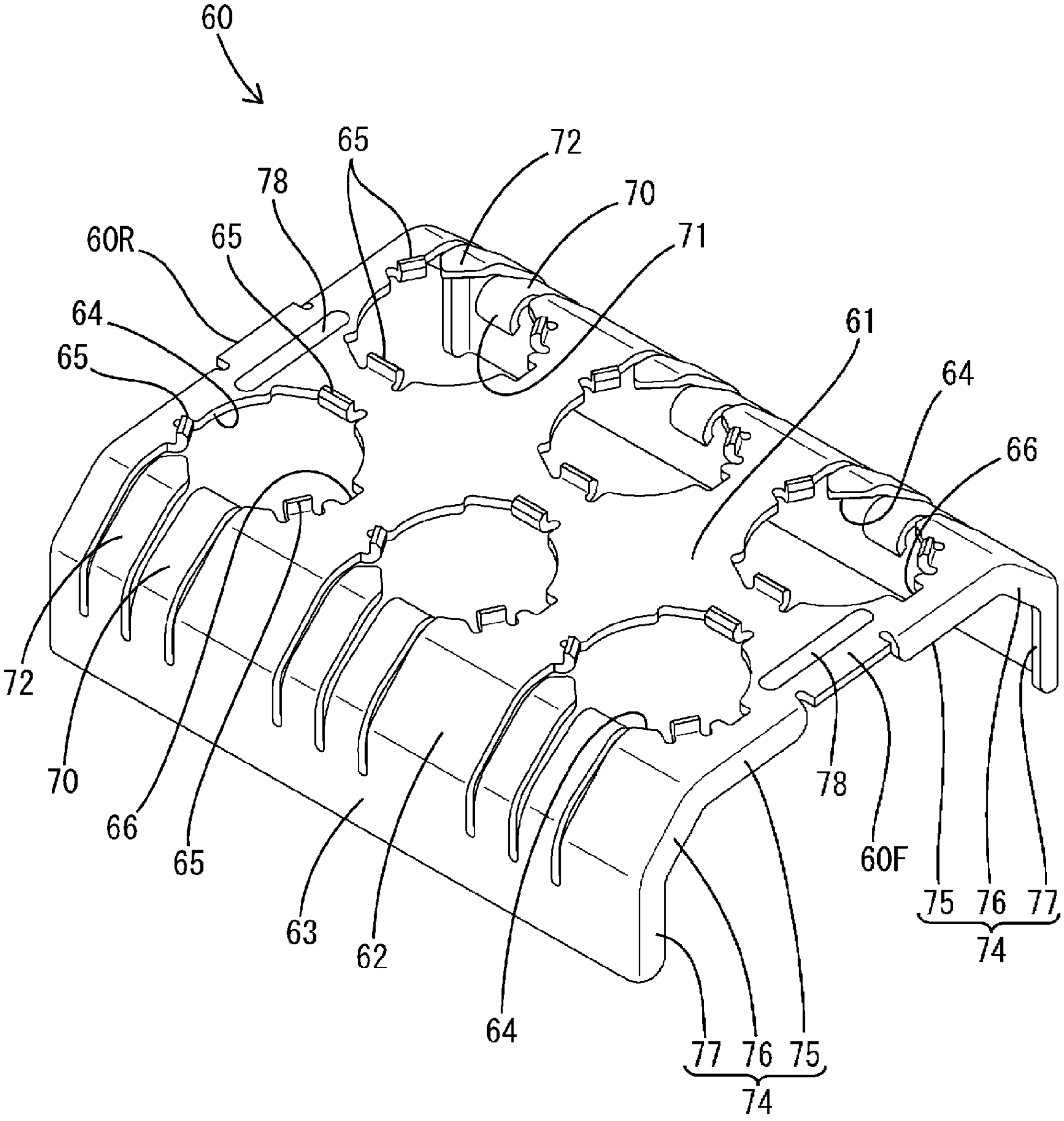
FIG. 6 is a perspective view of a coupling member viewed obliquely from above.
Figure 7:
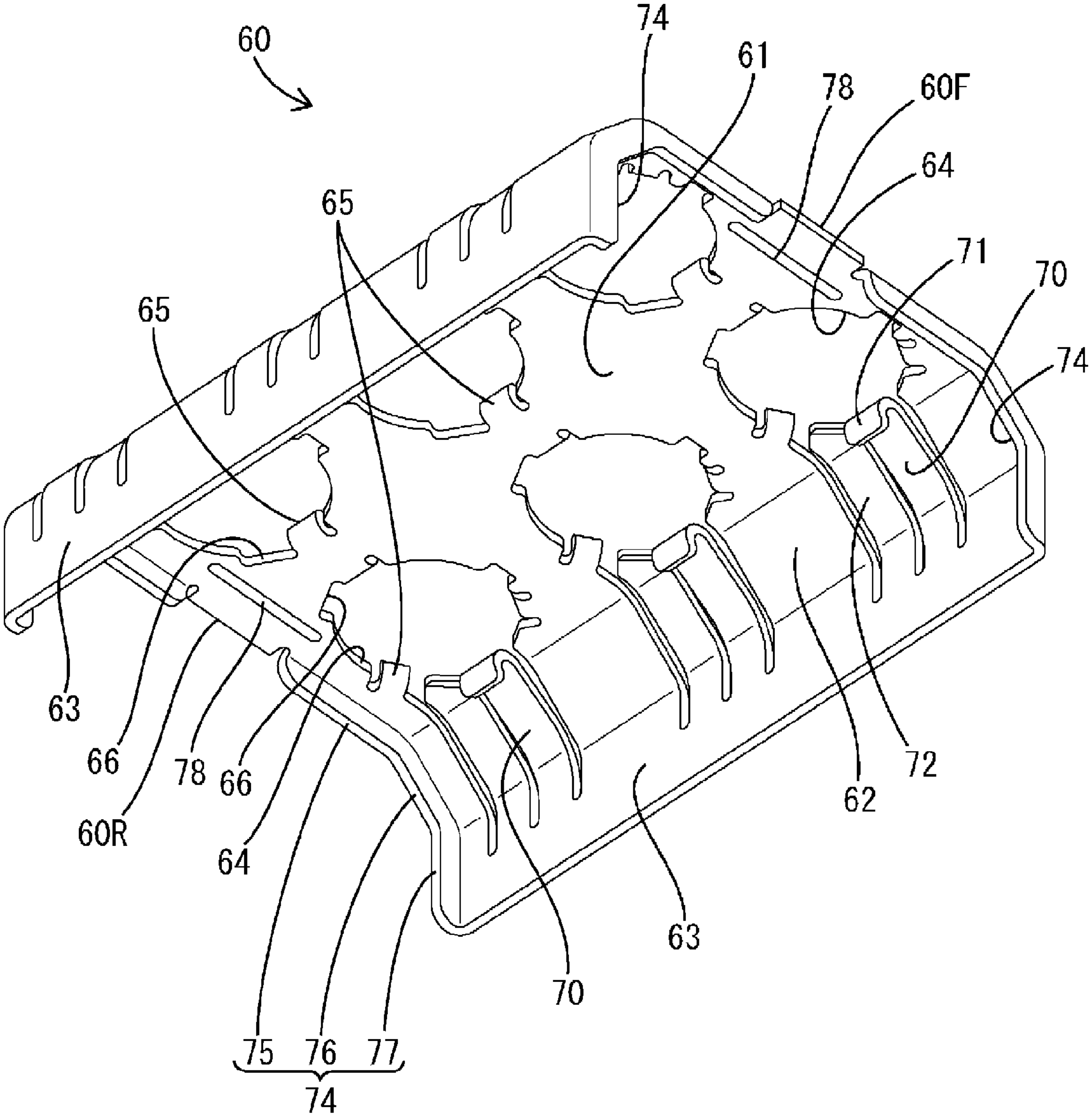
FIG. 7 is a perspective view of the coupling member viewed obliquely from below.
Figure 8:
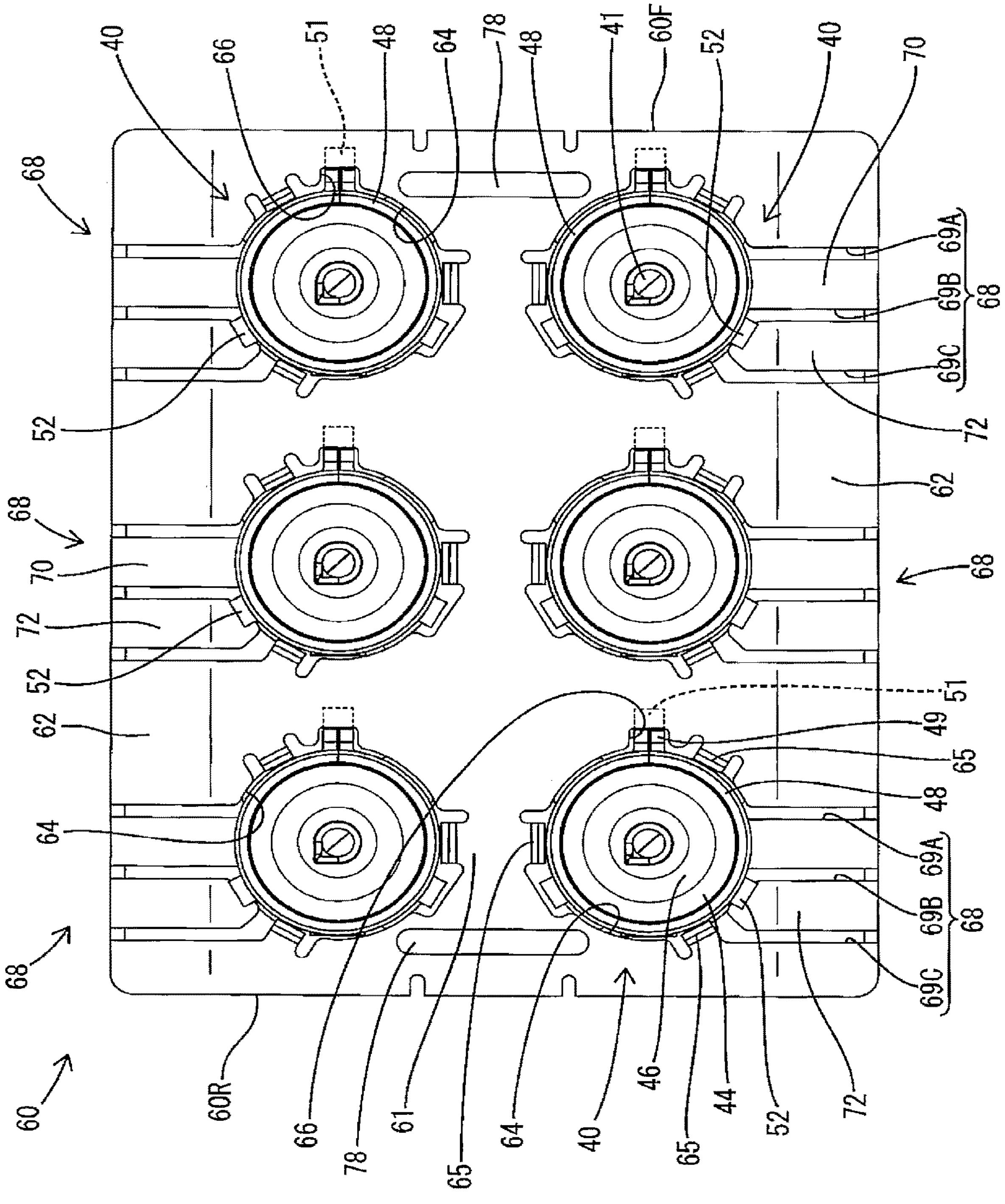
FIG. 8 is a plan view showing a state where the movable terminals are mounted in through holes of the coupling member.

One specific embodiment of a connector device of the present disclosure is described below with reference to FIGS. 1 to 8. Note that the present invention is not limited to these illustrations and is intended to be represented by claims and include all changes in the scope of claims and in the meaning and scope of equivalents. In this embodiment, an oblique right lower side in FIGS. 1, 2 and 6 and a right side in FIGS. 4 and 8 are defined as a front side concerning a front-rear direction. Upper and lower sides shown in FIGS. 1 to 7 are directly defined as upper and lower sides concerning a vertical direction. An oblique left lower side in FIGS. 1 and 2 is defined as a left side and left and right sides shown in FIG. 3 are directly defined as left and right sides concerning a lateral direction.

The connector device of this embodiment includes, as shown in FIGS. 1 and 2, a first connector 10, a second connector 30, movable terminals 40 and a coupling member 60. As shown in FIG. 3, the first connector 10 is mounted on a first circuit board Pa, and the second connector 30 is mounted on a second circuit board Pb. The first circuit board Pa is, for example, provided in an ECU (not shown) mounted in a roof of an automotive vehicle, and horizontally arranged with a mounting surface facing up, i.e. facing toward the side of an antenna. The second circuit board Pb is, for example, provided in the antenna (not shown) to be mounted in the roof (not shown) of the automotive vehicle. The second circuit board Pb is horizontally arranged with a mounting surface facing down, i.e. facing toward a vehicle interior side. The first and second circuit boards Pa, Pb are arranged in such a positional relationship that the mounting surfaces of the both are facing in parallel to each other.

If the first and second circuit boards Pa, Pb are brought closer, the both circuit boards Pa, Pb are connected via the first connector 10, the second connector 30 and the movable terminals 40. Since the first and second circuit boards Pa, Pb are connected without via a wiring harness, high-speed communication is possible between the first and second circuit boards Pa, Pb. Since assembly tolerances of the roof and the antenna are relatively large in an antenna mounted part in the roof of the automotive vehicle, position shifts possibly occur between the first and second circuit boards Pa, Pb in a horizontal direction intersecting a connecting direction of the both connectors 10, 30. The connector device of this embodiment is configured such that the both connectors 10, 30 are connected while the position shifts of the both circuit boards Pa, Pb are accommodated by rocking movements of the movable terminals 40.

<First Connector 10>

As shown in FIGS. 3 and 4, the first connector 10 includes a first housing 11 and a plurality of mounting terminals 13. With the first connector 10 mounted on the first circuit board Pa, the lower surface of the first housing 11 is fixed to the first circuit board Pa and lower end parts of the plurality of mounting terminals 13 are connected to a printed circuit (not shown) of the first circuit board Pa.

The first housing 11 is a single component having a rectangular parallelepiped shape and made of synthetic resin. The first housing 11 is formed with as many first terminal accommodation chambers 12 as the mounting terminals 13. The first terminal accommodation chambers 12 vertically penetrate through the first housing 11. The plurality of first terminal accommodation chambers 12 are divided into two left and right rows, and three chambers are arranged to be aligned in a row in the front-rear direction in each row. The plurality of mounting terminals 13 are individually accommodated in the plurality of first terminal accommodation chambers 12.

The mounting terminal 13 includes a mounting-side inner conductor 14 made of metal, a mounting-side dielectric 17 made of synthetic resin and a mounting-side outer conductor 18 made of metal. The mounting-side inner conductor 14 is a single component having a tubular shape with an axis oriented in the vertical direction orthogonal to the first circuit board Pa and including a mounting portion 15 and a mounting-side connecting portion 16. The mounting-side dielectric 17 has a hollow cylindrical shape with an axis oriented in the vertical direction. The mounting portion 15 of the mounting-side inner conductor 14 is accommodated in a center hole of the mounting-side dielectric 17. The mounting-side connecting portion 16 projects upward from the upper end surface of the mounting-side dielectric 17.

The mounting-side outer conductor 18 is a single component including an angular tube portion 19 having a regular octagonal shape and eight resilient arms 20. The eight resilient arms 20 extend upward from the angular tube portion 19 and are arranged side by side at equal angular intervals in a circumferential direction. A retaining portion 21 bent to project toward an inner peripheral side is formed on an upper end part (projecting end part) of each resilient arm 20. The eight resilient arms 20 surround the mounting-side connecting portion 16 of the mounting-side inner conductor 14 above the mounting-side dielectric 17.

By individually accommodating the plurality of mounting terminals 13 into the plurality of first terminal accommodation chambers 12, the first connector 10 is configured. The first connector 10 is mounted on the first circuit board Pa. With the first connector 10 mounted on the first circuit board Pa, the mounting portions 15 of the mounting-side inner conductors 14 are conductively welded to the mounting surface of the first circuit board Pa and lower end parts of the mounting-side outer conductors 18 are conductively welded to a ground circuit (not shown) on the mounting surface of the first circuit board Pa.

<Second Connector 30>

As shown in FIGS. 3 and 4, the second connector 30 includes a second housing 31 and as many mating terminals 36 as the mounting terminals 13. With the second connector 30 mounted on the second circuit board Pb, the upper surface of the second housing 31 is fixed to the mounting surface of the second circuit board Pb and upper end parts of a plurality of the mating terminals 36 are connected to a printed circuit (not shown) of the second circuit board Pb. The second housing 31 is a single component made of synthetic resin and including a terminal holding portion 32 having a rectangular parallelepiped shape and a rectangular guiding portion 34.

The terminal holding portion 32 is formed with a plurality of (six in this embodiment) second terminal accommodation chambers 33 vertically penetrating through the terminal holding portion 32. The second terminal accommodation chambers 33 are obtained by vertically inverting the first terminal accommodation chambers 12. The plurality of mating terminals 36 are individually accommodated in the plurality of second terminal accommodation chambers 33. The mating terminal 36 is the same component as the mounting terminal 13 and mounted in the second terminal accommodation chamber 33 in an orientation vertically inverted from that of the mounting terminal 13. Accordingly, components and parts of the mating terminal 36, which are the same as those of the mounting terminal 13, are not described and are denoted by the same reference signs as the components and parts constituting the mounting terminal 13.

The guiding portion 34 projects obliquely downward in a skirt-like manner from the outer peripheral edge of the lower end of the terminal holding portion 32. The guiding portion 34 is inclined to become wider toward the bottom (toward the first connector 10) with respect to the connecting direction of the both connectors 10, 30. An internal space of the guiding portion 34 communicates with the plurality of second terminal accommodation chambers 33 and is open downward of the second housing 31. The second connector 30 is mounted on the mounting surface of the second circuit board Pb in a manner similar to a mounting mode of the first connector 10 on the first circuit board Pa.

<Movable Terminal 40>

As shown in FIGS. 2 to 5, the movable terminal 40 has an elongated shape with an axis oriented in the vertical direction (facing direction of the first and second circuit boards Pa, Pb) as a whole. In this embodiment, a lower end part of the movable terminal 40, i.e. an end part on the side of the first circuit board Pa and on the side of the first connector 10, is defined as a base end part 40P. An upper end part of the movable terminal 40, i.e. an end part on the side of the second circuit board Pb and on the side of the second connector 30, is defined as a tip part 40T. The movable terminal 40 is a member configured by assembling a movable-side inner conductor 41 made of metal, a movable-side dielectric 44 made of synthetic resin and a movable-side outer conductor 48 made of metal.

The movable-side inner conductor 41 has a tubular shape elongated in an axial direction of the movable terminal 40. The movable-side inner conductor 41 is a single component including a hollow cylindrical body portion 42 and a pair of movable-side connecting portions 43 formed on both upper and lower end parts of the body portion 42. The movable-side dielectric 44 has a hollow cylindrical shape coaxial with the movable-side inner conductor 41. The movable-side inner conductor 41 is coaxially accommodated in an insertion hole 45 of the movable-side dielectric 44. Circular accommodation recesses 46 are formed in both end parts in the axial direction of the movable-side dielectric 44 by coaxially recessing both upper and lower end surfaces of the movable-side dielectric 44. The accommodation recesses 46 communicate with the insertion hole 45. The movable-side connecting portions 43 are accommodated in the accommodation recesses 46.

The movable-side outer conductor 48 has a hollow cylindrical shape as a whole. The movable-side outer conductor 48 coaxially surrounds the movable-side dielectric 44. A lower end part of the movable-side dielectric 44 projects further downward than the lower end of the movable-side outer conductor 48, and an upper end part of the movable-side dielectric 44 projects further upward than the upper end of the movable-side outer conductor 48. The movable terminal 40 is configured by assembling the movable-side inner conductor 41, the movable-side dielectric 44 and the movable-side outer conductor 48.

Figure 5:
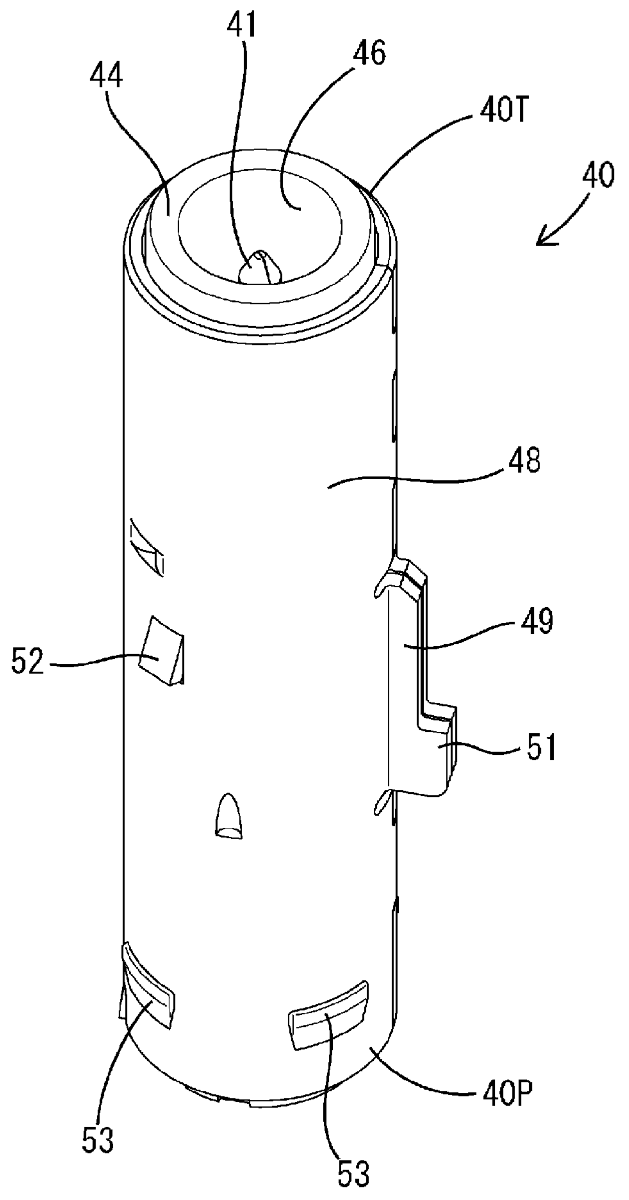
FIG. 5 is a perspective view of a movable terminal.

As shown in FIG. 5, a positioning protrusion 49, a projection-like first holding portion 51, a projection-like second holding portion 52 and four retaining projections 53 are formed on the outer peripheral surface of the movable-side outer conductor 48. The positioning protrusion 49 is in the form of a rib extending in the vertical direction in parallel to the axis of the movable-side outer conductor 48, and projects radially outward from the outer peripheral surface of the movable-side outer conductor 48. The first holding portion 51 projects further radially outward in a stepped manner from a projecting end surface in the lower end part of the positioning protrusion 49.

The second holding portion 52 projects obliquely downward from a position in a formation range of the positioning protrusion 49 in the vertical direction on the outer peripheral surface of the movable-side outer conductor 48. The second holding portion 52 is arranged at a position above the first holding portion 51 and different from the first holding portion 51 in a circumferential direction. The four retaining projections 53 are arranged at equal angular intervals in the circumferential direction. The four retaining projections 53 are arranged at positions below the first and second holding portions 51, 52 (closer to the base end part 40P of the movable terminal 40) and project obliquely upward from the outer peripheral surface of the movable-side outer conductor 48.

The movable terminal 40 is mounted in the first connector 10 by inserting the base end part 40P of the movable terminal 40 into the first terminal accommodation chamber 12 from above the first housing 11. In a mounting process, the mounting-side connecting portion 16 of the mounting-side inner conductor 14 is accommodated into the accommodation recess 46 and resiliently contacts the movable-side connecting portion 43 of the movable-side inner conductor 41.

In the process of mounting the movable terminal 40 into the first connector 10, the retaining projections 53 interfere with the retaining portions 21 to resiliently deform the resilient arms 20 radially outward. Thus, friction resistance is generated between the resilient arms 20 and the movable-side outer conductor 48. However, since the number of the retaining projections 53 is four, i.e. half the number of the resilient arms 20, resistance due to the interference of the retaining projections 53 and the retaining portions 21 is suppressed to be small as compared to the case where eight retaining projections 53 interfere with the eight resilient arms 20. By the contact of the outer peripheral surface of the movable-side outer conductor 48 with the retaining portions 21, the movable-side outer conductor 48 and the mounting-side outer conductor 18 are conductively connected.

Since the retaining portions 21 project toward the inner peripheral side, the movable terminal 40 is restricted from being separated upward from the mounting terminal 13 and is held in a rockable state by locking the retaining portions 21 and the retaining projections 53. In the axial direction of the movable terminal 40, the contact positions of the retaining portions 21 and the movable-side outer conductor 48 and the contact position of the mounting-side connecting portion 16 and the movable-side connecting portion 43 are at the same height. A rocking fulcrum of the movable terminal 40 is a contact part of the movable-side connecting portion 43 with the mounting-side connecting portion 16.

The lower end part of the movable-side dielectric 44 projects further downward than the lower end edge of the movable-side outer conductor 48. Accordingly, when the movable terminal 40 rocks, there is no possibility that the movable-side outer conductor 48 contacts the upper end surface of the mounting-side dielectric 17 and the movable-side outer conductor 48 made of metal scratches the mounting-side dielectric 17 made of synthetic resin.

The movable terminal 40 mounted in the mounting terminal 13 projects upward from the first housing 11. The upper end part (tip part 40T) of the movable terminal 40 is connected to the mating terminal 36 of the second connector 30. Since one movable terminal 40 is supported in a state in contact with only one mounting terminal 13, the plurality of movable terminals 40 can individually rock in directions different from the other movable terminals 40. The connector device of this embodiment includes the coupling member 60 as a means for integrally rocking the plurality of movable terminals 40.

<Coupling Member 60>

The coupling member 60 is formed by stamping an electrically conductive plate material such as a metal plate material into a predetermined shape by press-working. As shown in FIGS. 6 and 7, the coupling member 60 is a single component including a base plate portion 61 in the form of a flat plate, a pair of bilaterally symmetrical slope portions 62 in the form of flat plates and a pair of bilaterally symmetrical vertical wall portions 63 in the form of flat plates. In a plan view of the coupling member 60, the coupling member 60 has a rectangular shape. In a front view of the coupling member 60, the coupling member 60 has an isosceles trapezoidal shape.

In the plan view, the base plate portion 61 has a rectangular shape. The pair of slope portions 62 extend obliquely to lower outer sides from both left and right side edge parts of the base plate portion 61. The pair of vertical wall portions 63 project downward perpendicularly to the base plate portion 61 from the lower end edges of the slope portions 62. The base plate portion 61, the slope portions 62 and the vertical wall portions 63 have the same dimension in the front-rear direction.

The coupling member 60 is formed with six holding holes 64 penetrating through the base plate portion 61 and arranged to correspond to the first terminal accommodation chambers 12. In the plan view, the holding portion 64 has a circular opening. An inner diameter of the holding hole 64 is slightly larger than an outer diameter of the movable-side outer conductor 48. As shown in FIGS. 6 to 8, three abutting portions 65 arranged at equal angular intervals in a circumferential direction and one positioning recess 66 are formed on an opening edge part of each holding hole 64. Out of the three abutting portions 65, one abutting portion 65 is arranged at a position closest to the holding hole 64 adjacent in the lateral direction. Out of the three abutting portions 65, two abutting portions 65 are arranged at an interval in parallel to a boundary line in the front-rear direction between the base plate portion 61 and the slope portion 62. The positioning recess 66 is arranged at the front end of the holding hole 64.

Each abutting portion 65 is formed by bending upward a part projecting radially inward from the opening edge part of the holding hole 64. A fracture surface during press-working is exposed on the inner peripheral surface of the opening edge part of the holding hole 64, but surfaces of the abutting portions 65 facing an opening region of the holding hole 64 are non-fracture surfaces, which were not fractured during press-working. The positioning recess 66 is formed by partially recessing the opening edge part of the holding hole 64.

As shown in FIG. 8, the coupling member 60 is formed with six slit groups 68 individually corresponding to the six holding holes 64. Each slit group 68 is composed of three first to third slits 69A, 69B and 69C communicating with the opening edge of the corresponding holding hole 64. The three slits 69A, 69B and 69C are parallel to each other and extend in the lateral direction. In particular, the three slits 69A, 69B and 69C pass through the base plate portion 61 and the slope portion 62 and reach a central part of the vertical wall portion 63 in a height direction from a region between the two front and rear abutting portions 65 on the opening edge of the holding hole 64.

A part of the coupling member 60 between the first and second slits 69A, 69B functions as a resiliently deformable resilient contact piece 70. One resilient contact piece 70 is provided to correspond to one holding hole 64. The resilient contact piece 70 has a bent shape in a front view and is cantilevered from the vertical wall portion 63 toward the holding hole 64. In a plan view, the resilient contact piece 70 extends toward a center of the holding hole 64. As shown in FIGS. 3, 6 and 7, a contact point portion 71 arcuately bent downward is formed on an extending end part of the resilient contact piece 70. A surface of the contact point portion 71 facing the opening region of the holding hole 64 is a non-fracture surface, which was not fractured during the press-working of the coupling member 60, similarly to the abutting portions 65.

A part of the coupling member 60 between the second and third slits 69B, 69C functions as a resiliently deformable resilient holding piece 72. An end part of the third slit 69C communicating with the holding hole 64 is bent to be parallel to a radial direction of the holding hole 64. One resilient holding piece 72 is provided to correspond to one holding hole 64. The resilient holding piece 72 has a bent shape in a front view and is cantilevered from the vertical wall portion 63 toward the holding hole 64, similarly to the resilient contact piece 70. In a plan view, the resilient holding piece 72 extends toward a position eccentric from the center of the holding hole 64. An extending end part of the resilient holding piece 72 is arranged to be adjacent to the contact point portion 71 in the circumferential direction and facing the opening region of the holding hole 64.

As shown in FIGS. 6 to 8, the coupling member 60 includes four first reinforcing ribs 74 and two second reinforcing ribs 78 to enhance the rigidity of the coupling member 60. The outer peripheral edge of the coupling member 60 is composed of a front end edge, a rear end edge and both left and right side edges. A strip-like region along the front end edge of the coupling member 60 is defined as a front edge part 60F. A strip-like region along the rear end edge of the coupling member 60 is defined as a rear edge part 60R. The first reinforcing ribs 74 are integrally formed to the front edge part 60F and the rear edge part 60R. In particular, the first reinforcing rib 74 is composed of a base plate rib 75, a slope rib 76 and a vertical wall rib 77. The base plate ribs 75 project downward perpendicularly to the base plate portion 61 from regions of the front and rear end edges of the base plate portion 61 except laterally central parts. The slope ribs 76 project obliquely downward perpendicularly to the slope portions 62 from the entire regions of the front and rear end edges of the slope portions 62. The vertical wall ribs 77 project perpendicularly to the vertical wall portions 63 toward the vertical wall portions 63 on opposite sides from the entire regions of the front and rear end edges of the vertical wall portions 63. The base plate rib 75, the slope rib 76 and the vertical wall rib 77 are connected into one while having a bent shape in a front view.

The second reinforcing ribs 78 are in the form of ribs projecting upward from a laterally central part of the upper surface of the base plate portion 61. The second reinforcing ribs 78 are arranged in the front edge part 60F, which is a part behind the front end edge of the base plate portion 61, and the rear edge part 60R, which is a part in front of the rear end edge of the base plate portion 61. The second reinforcing ribs 78 linearly extend in the lateral direction in parallel to the front and rear end edges. Formation ranges of the second reinforcing ribs 78 and those of the first reinforcing ribs 74 overlap in the lateral direction along the front and rear edge parts 60F, 60R of the coupling member 60. In particular, end parts of the first reinforcing ribs 74 in the base plate portion 61, i.e. end parts of the base plate rib 75, and both left and right end parts of the second reinforcing rib 78 are arranged to overlap in the front view.

In a forming step of the coupling member 60, a plurality of coupling members 60 connected to strip-like carriers (not shown) are separated. Since the coupling member 60 of this embodiment is linked to the carriers in laterally central parts of the front and rear end edges of the base plate portion 61, the first reinforcing ribs 74 cannot be formed in the parts of the base plate portion 61 linked to the carriers. However, regions of the base plate portion 61 where the first reinforcing ribs 74 cannot be formed are reinforced by the second reinforcing ribs 78.

After the movable terminals 40 are mounted into the first connector 10, the coupling member 60 is mounted on the movable terminals 40. In mounting the coupling member 60, each holding hole 64 is fit to the movable terminal 40 from above. When the fitting of the holding holes 64 and the movable terminals 40 is started, the contact point portions 71 of the resilient contact pieces 70 contact the outer peripheral surfaces of the movable-side outer conductors 48. In the process of mounting the coupling member 60 on the movable terminals 40, the resilient contact pieces 70 are resiliently deformed and the contact point portions 71 slide in contact with the outer peripheral surfaces of the movable-side outer conductors 48.

If the opening edge part of the holding hole 64 butts against an upper end part of the positioning protrusion 49 in the process of fitting the holding hole 64 to the movable terminal 40, the movable terminal 40 is rotated about the axis of the movable terminal 40 and the upper end part of the positioning protrusion 49 is fit into the positioning recess 66. By the fitting of the positioning recess 66 and the positioning protrusion 49, the movable terminal 40 is aligned with the holding hole 64 in the circumferential direction, whereby the six movable terminals 40 are positioned with respect to the coupling member 60.

If the coupling member 60 is further lowered after the movable terminals 40 are positioned, the extending end parts of the resilient holding pieces 72 interfere with the second holding portions 52. Thus, the resilient holding pieces 72 are resiliently displaced obliquely upward, radially away from the outer peripheral surfaces of the movable-side outer conductors 48. The resilient holding pieces 72 resiliently return after passing through the second holding portions 52 by being resiliently displaced. The extending end parts of the resiliently returned resilient holding pieces 72 are positioned to be lockable to the second holding portions 52 from below. At the same time as the resilient holding pieces 72 resiliently return or immediately after the resilient holding pieces 72 resiliently return, the opening edge parts of the holding holes 64 come into contact with the first holding portions 51 from above.

In the above way, the mounting of the coupling member 60 on the movable terminals 40 is completed, a relative displacement of each movable terminal 40 with respect to the coupling member 60 is restricted and the six movable terminals 40 are coupled via the coupling member 60. Since the coupling member 60 restricts mutual relative displacements of the six movable terminals 40, the six movable terminals 40 rock in the same direction and by the same angle at once integrally with the coupling member 60 when an external force in a rocking direction acts on one of the movable terminals 40.

With the coupling member 60 and the movable terminals 40 assembled, the coupling member 60 is restricted from being separated upward from the movable terminals 40 by the locking of the resilient holding pieces 72 and the second holding portions 52. By the locking of the opening edge parts of the holding holes 64 and the first holding portions 51, the coupling member 60 is held at such a height as to be lifted upward from the first housing 11, i.e. in a state not interfering with the first housing 11. Since the contact point portions 71 of the resilient contact pieces 70 are resiliently in contact with the outer peripheral surfaces of the movable-side outer conductors 48, six movable-side outer conductors 48 are held at the same potential via the coupling member 60.

Functions and Effects of Embodiment

If the first and second circuit boards Pa, Pb are relatively displaced at the time of connecting the first and second connectors 10, 30, the tip part 40T of any one of the movable terminals 40 comes into contact with the inner surface of the guiding portion 34. If the connection of the connectors 10, 30 proceeds from this state, the tip part 40T of the movable terminal 40 slides in contact with the inclined inner surface of the guiding portion 34, whereby the tip parts 40T of all the movable terminals 40 are integrally guided to connection positions to the mating terminals 36 while changing rocking angles at once. After passing through the guiding portion 34, the tip parts 40T of the movable terminals 40 are connected to the mating terminals 36 and the first and second connectors 10, 30 are properly connected. When the both connectors 10, 30 are properly connected, the first and second circuit boards Pa, Pb are connected via the mounting terminals 13 and the mating terminals 36.

The connector device of this embodiment includes the first housing 11 to be mounted on the first circuit board Pa, the plurality of mounting terminals 13, the plurality of movable terminals 40 and the coupling member 60. The plurality of mounting terminals 13 are mounted in the first housing 11 and mounted and connected to the first circuit board Pa. The plurality of movable terminals 40 are individually rockable with the plurality of mounting terminals 13 as fulcrums. The plurality of movable terminals 40 are individually connected to the plurality of mating terminals 36. The coupling member 60 is formed such that the plurality of movable terminals 40 are passed therethrough to be individually and integrally rockable.

According to this configuration, since the plurality of movable terminals 40 are integrally rocked by the coupling member 60, the tip parts 40T of the plurality of movable terminals 40 are held in a fixed positional relationship and reliably connected to the plurality of mating terminals 36. Thus, the connector device of this embodiment is excellent in connection function of the movable terminals 40 and the mating terminals 36.

The plurality of movable terminals 40 are formed with the first holding portions 51 and the second holding portions 52 for holding the plurality of movable terminals 40 in a state passed through the coupling member 60. According to this configuration, since the plurality of movable terminals 40 are held in the state passed there the coupling member 60, the first housing 11 needs not be provided with a structure for preventing the separation of the coupling member 60 from the plurality of movable terminals 40. Since the first housing 11 can be reduced in size in this way, the entire connector device can be reduced in size.

The coupling member 60 is formed with the resilient holding pieces 72 to be resiliently locked to the second holding portions 52. When the coupling member 60 and the movable terminals 40 are relatively inclined as the plurality of movable terminals 40 rock, the resilient holding pieces 72 are flexibly resiliently deformed by being pushed by the second holding portions 52. Thus, prying is hardly caused between the coupling member 60 and the movable terminals 40. In this way, the movable terminals 40 smoothly rock.

The coupling member 60 is made of an electrically conductive material. The coupling member 60 is formed with the resilient contact pieces 70 configured to resiliently contact the movable-side outer conductors 48 of the movable terminals 40. According to this configuration, since the plurality of movable-side outer conductors 48 are made conductive via the coupling member 60, a potential difference is not generated between the plurality of movable-side outer conductors 48. Therefore, the connector device of this embodiment is excellent in grounding function.

Since the coupling member 60 is plate-like, there is a concern that the coupling member 60 is deformed to strain when the movable terminals 40 rock. However, since the coupling member 60 of this embodiment is integrally formed with the first reinforcing ribs 74 and the second reinforcing ribs 78 as rib-like reinforcing portions, the coupling member 60 can be prevented from being deformed to strain. In this way, the orientations and postures of the plurality of movable terminals 40 during rocking movements can be aligned.

The reinforcing portions for enhancing the rigidity of the coupling member 60 include the first reinforcing ribs 74 and the second reinforcing ribs 78. The first reinforcing ribs 74 are bent to project from the front end edge of the front edge parts 60F and the rear end edge of the rear edge part 60R, out of the outer peripheral edge of the coupling member 60. The second reinforcing ribs 78 are arranged in the front and rear edge parts 60F, 60R. The second reinforcing ribs 78 are separated from the front and rear end edges of the coupling member 60 and extend along the front and rear end edges. Parts of the coupling member 60 along the front end edge and along the rear end edge are reinforced by the first and second reinforcing ribs 74, 78. Although the first reinforcing ribs 74 are not formed in the laterally central parts of the front and rear end edges of the coupling member 60, the second reinforcing ribs 78 are arranged in the regions of the front and rear edge parts 60F, 60R where the first reinforcing ribs 74 are not formed. The region of the front edge part 60F of the coupling member 60 where the first reinforcing ribs 74 bent to project from the front end edge of the front edge part 60F cannot be formed can be reinforced by the second reinforcing rib 78 formed in the front edge part 60F. The region of the rear edge part 60R of the coupling member 60 where the first reinforcing ribs 74 bent to project from the rear end edge of the rear edge part 60R cannot be formed can be reinforced by the second reinforcing rib 78 formed in the rear edge part 60R.

The end parts of the first reinforcing ribs 74 in the base plate portion 61 and the both left and right end parts of the second reinforcing ribs 78 are partially arranged in the same regions in length directions of the front and rear edge parts 60F, 60R of the coupling member 60. According to this configuration, the entire region of the front edge part 60F of the coupling member 60 and the entire region of the rear edge part 60R of the coupling member 60 can be reliably reinforced by either the first reinforcing ribs 74 or the second reinforcing ribs 78 or both the first reinforcing ribs 74 and the second reinforcing ribs 78.

Other Embodiments

The present invention is not limited by the above described and illustrated embodiment, but is represented by claims. The present invention is intended to include all changes in the scope of claims and in the meaning and scope of equivalents and also include the following embodiments.

Although the coupling member includes the resilient holding pieces to be resiliently locked to the holding portions in the above embodiment, the coupling member may be formed such that only resiliently non-deformable parts are locked to the holding portions.

Although the plurality of movable-side outer conductors are made conductive via the coupling member in the above embodiment, the coupling member may be made of an electrically nonconductive material.

Although the resilient contact piece resiliently contacts the movable-side outer conductor while projecting from the outer surface of the coupling member in the above embodiment, the resilient contact piece may resiliently contact the movable-side outer conductor in a state flush with the outer surface of the coupling member or in a state retracted inwardly from the outer surface of the coupling member.

Although the coupling member is formed with the reinforcing portions in the above embodiment, the coupling member may not be formed with the reinforcing portions.

Although the reinforcing portions include the first reinforcing ribs and the second reinforcing ribs in the above embodiment, the reinforcing portions may include only either the first reinforcing ribs or the second reinforcing ribs.

Although the first and second reinforcing ribs are partially arranged in the same regions in the length direction of the outer peripheral edge of the coupling member in the above embodiment, the first and second reinforcing ribs may be arranged only in regions different from each other in the length direction of the outer peripheral edge of the coupling member.

LIST OF REFERENCE NUMERALS

10 . . . first connector
11 . . . first housing (housing)
12 . . . first terminal accommodation chamber
13 . . . mounting terminal
14 . . . mounting-side inner conductor
15 . . . mounting portion
16 . . . mounting-side connecting portion
17 . . . mounting-side dielectric
18 . . . mounting-side outer conductor
19 . . . angular tube portion
20 . . . resilient arm
21 . . . retaining portion
30 . . . second connector
31 . . . second housing
32 . . . terminal holding portion
33 . . . second terminal accommodation chamber
34 . . . guiding portion
36 . . . mating terminal
40 . . . movable terminal
40P . . . base end part of movable terminal
40T . . . tip part of movable terminal
41 . . . movable-side inner conductor
42 . . . body portion
43 . . . movable-side connecting portion
44 . . . movable-side dielectric
45 . . . insertion hole
46 . . . accommodation recess
48 . . . movable-side outer conductor
49 . . . positioning protrusion
51 . . . first holding portion
52 . . . second holding portion
53 . . . retaining projection
60 . . . coupling member
60F . . . front edge part of coupling member
60R . . . rear edge part of coupling member
61 . . . base plate portion
62 . . . slope portion
63 . . . vertical wall portion
64 . . . holding hole
65 . . . abutting portion
66 . . . positioning recess
68 . . . slit group
69A . . . first slit
69B . . . second slit
69C . . . third slit
60 . . . resilient contact piece
61 . . . contact point portion
62 . . . resilient holding piece
64 . . . first reinforcing rib
65 . . . base plate rib
66 . . . slope rib
67 . . . vertical wall rib
68 . . . second reinforcing rib
Pa . . . first circuit board (circuit board)
Pb . . . second circuit board

What is claimed is:

1. A connector device, comprising:
a housing mounted on a circuit board;
a plurality of mounting terminals mounted into the housing and connected to the circuit board;
a plurality of movable terminals individually rockable with the plurality of mounting terminals as fulcrums, the movable terminals being individually connected to a plurality of mating terminals; and
a coupling member made of an electrically conductive material, the coupling member including a plurality of holding holes, the plurality of movable terminals being individually passed through the plurality of holding holes of the coupling member,
wherein the plurality of movable terminals is formed with holding portions configured to hold the plurality of movable terminals in a state passed through the coupling member,
the coupling member includes a resilient holding piece resiliently locked to the holding portion and a resilient contact piece configured to resiliently contact a movable-side outer conductor of the movable terminal,
the coupling member is provided with three slits extending in parallel to each other in a direction perpendicular to a peripheral edge of the coupling member from an opening edge of each of the plurality of holding holes when viewed from above, and
the resilient holding piece and the resilient contact piece are formed in parallel to each other by the three slits.

2. The connector device of claim 1, wherein:
the coupling member is plate-like, and
the coupling member is formed with a rib-like projecting reinforcing portion.

3. The connector device of claim 2, wherein the reinforcing portion includes a first reinforcing rib bent to project from an outer peripheral edge of the coupling member and a second reinforcing rib arranged along the outer peripheral edge in a region of the coupling member separated from the outer peripheral edge.

4. The connector device of claim 3, wherein the first and second reinforcing ribs are partially arranged in the same region in a length direction of the outer peripheral edge.

5. The connector device of claim 1, wherein an extending end of the resilient contact piece is bent downward in each of the plurality of holding holes.

* * * * *